United States Patent
Tang et al.

(10) Patent No.: US 8,964,432 B2
(45) Date of Patent: Feb. 24, 2015

(54) APPARATUS AND METHOD FOR CONTROLLING CIRCULATING CURRENT IN AN INVERTER SYSTEM

(71) Applicant: The Boeing Company, Chicago, IL (US)

(72) Inventors: Qingquan Tang, Brooklyn, NY (US); Dazhong Gu, Brooklyn, NY (US); Dariusz Czarkowski, S. Setauket, NY (US); Francisco de Leon, Ridgewood, NJ (US); Kamiar Karimi, Kirkland, WA (US); Shengyi Liu, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 190 days.

(21) Appl. No.: 13/752,813

(22) Filed: Jan. 29, 2013

(65) Prior Publication Data
US 2014/0211522 A1    Jul. 31, 2014

(51) Int. Cl.
| | |
|---|---|
| *H02M 7/493* | (2007.01) |
| *H02M 1/12* | (2006.01) |
| *H02M 7/48* | (2006.01) |
| H02M 7/5387 | (2007.01) |

(52) U.S. Cl.
CPC *H02M 1/12* (2013.01); *H02M 7/48* (2013.01); *H02M 2007/4822* (2013.01)
USPC .............................................. 363/71; 363/98

(58) Field of Classification Search
CPC ......... Y02B 70/1441; H02M 7/53871; H02M 7/5387; H02M 7/53875; H02M 7/493
USPC ............................ 363/65, 71, 72, 95, 98, 132
See application file for complete search history.

(56) References Cited

U.S. PATENT DOCUMENTS

| | | | | |
|---|---|---|---|---|
| 5,262,935 | A * | 11/1993 | Shirahama et al. | 363/71 |
| 5,946,205 | A * | 8/1999 | Kawakami et al. | 363/65 |
| 6,169,677 | B1 * | 1/2001 | Kitahata et al. | 363/71 |
| 8,422,256 | B2 * | 4/2013 | Giuntini et al. | 363/71 |

OTHER PUBLICATIONS

Asiminoaei, Lucian, et al., "Shunt Active-Power-Filter Topology Based on Parallel Interleaved Inverters", IEEE Transactions on Industrial Electronics, vol. 55, No. 3, Mar. 2008, pp. 1175-1189.

(Continued)

*Primary Examiner* — Gary L Laxton
(74) *Attorney, Agent, or Firm* — Kunzler Law Group, PC

(57) ABSTRACT

A power conversion system is disclosed that provides multiphase power, including phase voltages for each phase of the multiphase power. The system comprises a plurality of inverters that generate PWM output voltages based on PWM control signals. A plurality of inductive components is configured to receive the PWM output voltages to generate the phase voltages. The PWM output voltages cause circulating current flows through the inductive components. A voltage controller is employed that is responsive to the phase voltages to generate voltage modulation signals corresponding to the phase voltages. A plurality of current sharing channels are respectively associated with each of the plurality of inductive components and are configured generate current sharing modulation signals in response to the circulating current flows. The PWM control signals are generated based on modulation signals obtained by combining the current sharing modulation signals and voltage modulation signals.

25 Claims, 11 Drawing Sheets

(56) References Cited

OTHER PUBLICATIONS

Borup, Uffe, et al., "Sharing of Nonlinear Load in Parallel-Connected Three-Phase Converters", IEEE Transactions on Industry Applications, vol. 37, No. 6, Dec. 2001, pp. 1817-1823.

Cougo, Bernardo, et al., "Parallel Three-Phase Inverters: Optimal PWM Method for Flux Reduction in Intercell Transformers", IEEE Transactions on Power Electronics, vol. 26, No. 8, Aug. 2011, pp. 2184-2191.

De Brabandere, Karel, et al., "A Voltage and Frequency Droop Control Method for Parallel Inverters", IEEE Transactions on Power Electronics, vol. 22, No. 4, Jul. 2007, pp. 1107-1115.

Forest, Francois, et al., "Design and Comparison of Inductors and Intercell Transformers for Filtering of PWM Inverter Output", IEEE Transactions on Power Electronics, vol. 24, No. 3, Mar. 2009, pp. 812-821.

Forest, Francois, et al., "Optimization of the Supply Voltage System in Interleaved Converters Using Intercell Transformers", IEEE Transactions on Power Electronics, vol. 22, No. 3, May 2007, pp. 934-942.

Laboure, Eric, et al., "A Theoretical Approach to InterCell Transformers, Application to Interleaved Converters", IEEE Transactions on Power Electronics, vol. 23, No. 1, Jan. 2008, pp. 464-474.

Le Bolloch, Mathieu, et al., "Current-Sharing Control Technique for Interleaving VRMs Using Intercell Transformers", Power Electronics and Applications, 2009. EPE '09. 13th European Conference on Sep. 8-10, 2009. (10 pages).

Sun, Xiao, et al., "Modeling, Analysis, and Implementation of Parallel Multi-Inverter Systems With Instantaneous Average-Current-Sharing Scheme", IEEE Transactions on Power Electronics, vol. 18, No. 18, May 2003, pp. 844-856.

\* cited by examiner

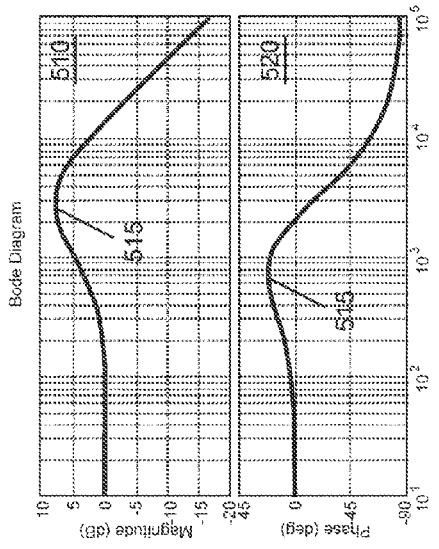
Bode diagram of phase delay compensator
FIGURE 7B
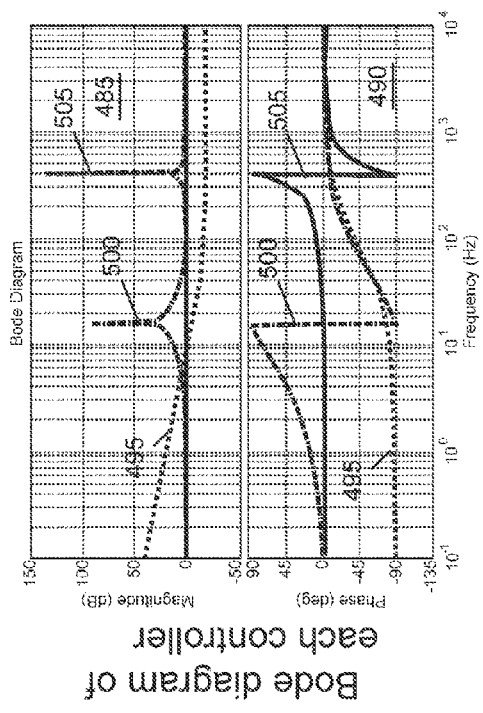
Bode diagram of each controller
FIGURE 7A
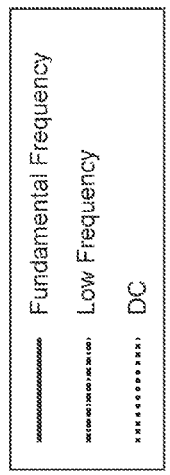
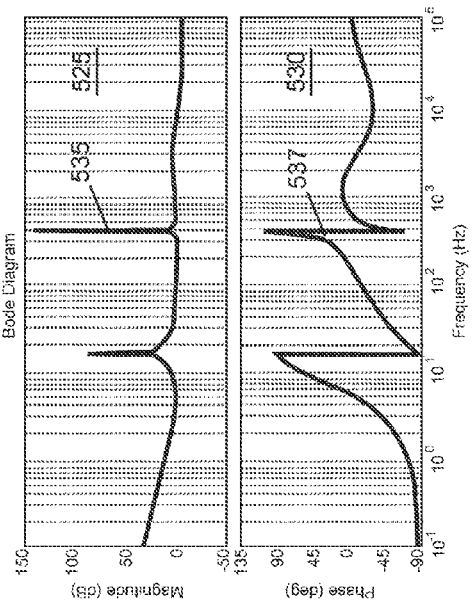
Bode diagram of overall current sharing controller
FIGURE 7C

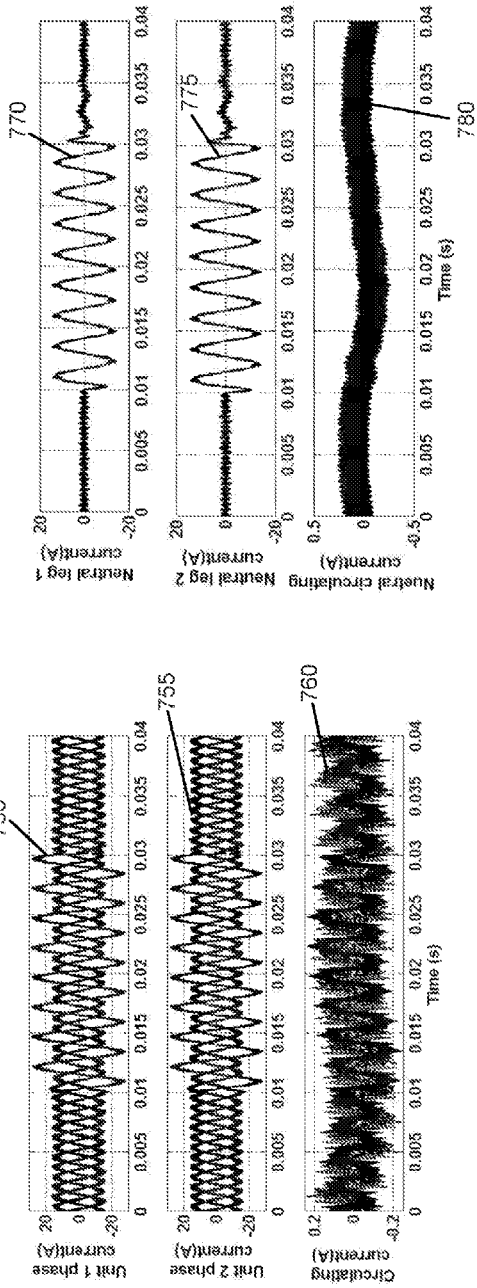
Figure 10A
Figure 10B
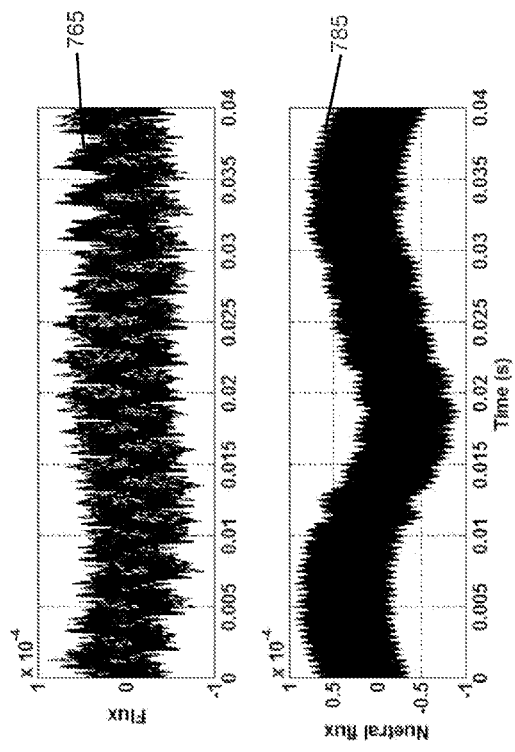
Figure 10C

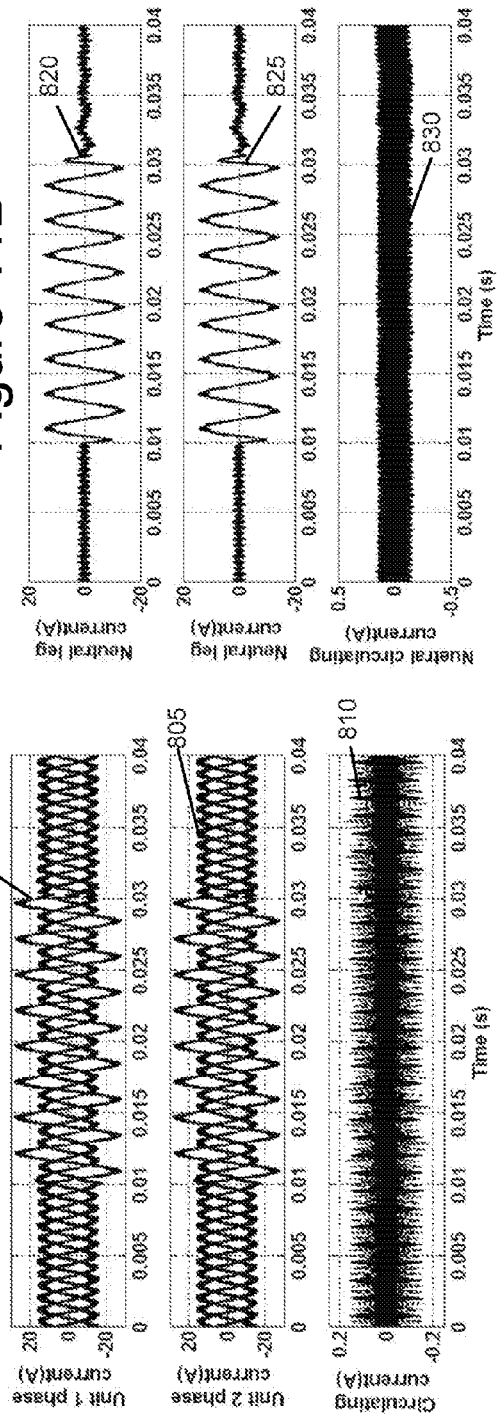
Figure 11A
Figure 11B
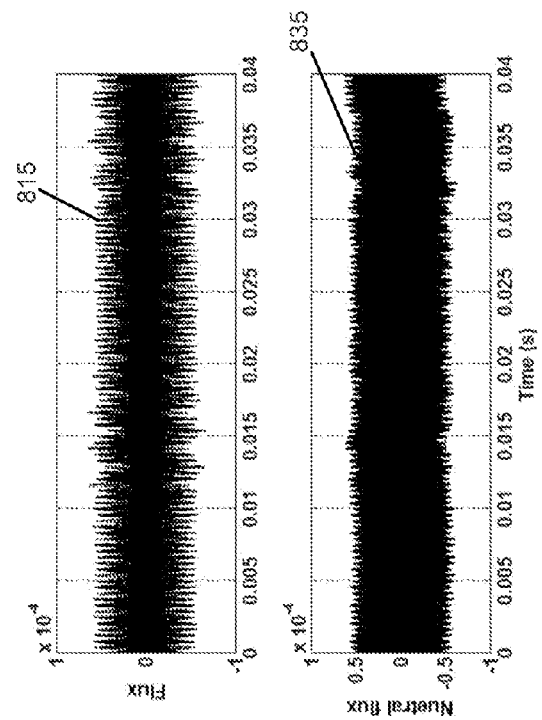
Figure 11C ations # US 8,964,432 B2

APPARATUS AND METHOD FOR CONTROLLING CIRCULATING CURRENT IN AN INVERTER SYSTEM

BACKGROUND

Power converters are used in aircraft electrical power systems as well as in power systems for other apparatus. The electrical power systems on current commercial aircraft are primarily provided by 400 Hz, three-phase 115V or 230V AC power sources. The power system may include one or more alternative low voltage DC power sources, such as a fuel cell stack or a battery, which provides input power to a pulse width modulated (PWM) power conversion system. Multiphase voltage outputs, such as three-phase voltages, maybe provided to an aircraft electric power distribution system, which provides the electrical power to a downstream distribution system. The downstream distribution system may have loads of various types, including, but not limited to, three-phase, single-phase, or another conversion system with DC loads, etc.

Many power converters, however, are not fully optimized for aircraft applications. Such power converters may be large and heavy, increasing the weight of the aircraft and limiting the volume available to other aircraft components. To address this issue, power converters may include paralleled or interleaved inverters. By using paralleled or interleaved inverters, the conversion systems may achieve higher power while concurrently using lower rating devices, thus also achieving higher efficiency, higher power density (measured in kW/kg), and weight and volume savings. Additionally, interleaved converters improve the harmonic reduction compared with non-interleaved converters. However, such converter systems may generate circulating current, which may degrade the performance or cause malfunctions, even to the point of damaging the user equipment connected to the power bus.

In power converters employing paralleled or interleaved inverters, the inverter outputs may be connected to inductive components to limit the circulating current. However, the inductive components often do not work well in low frequency circulating current. The low frequency circulating currents may cause saturation of the cores of the inductive components. Saturation of the cores may reduce the performance of the power converter as well as disable the conversion system.

Also in designing the power converter, large magnetizing inductances may be desired to reduce core loss and better limit high frequency circulating currents. However, this may require advanced and accurate knowledge of system parameters, which makes the design process complicated and time-consuming. For example, the complexity of control system design may be caused by a reduced margin on the flux of a given magnetic core when a large magnetizing inductance is desired.

Therefore, there are at least two problems associated with power conversion systems. They may experience reduced performance when used with high transient loads. Also, the design process may complicated and time-consuming.

SUMMARY

A power conversion system is disclosed that provides multiphase power, including phase voltages for each phase of the multiphase power. The system comprises a plurality of inverters that generate PWM output voltages based on PWM control signals. A plurality of inductive components are configured to receive the PWM output voltages to generate the phase voltages. The PWM output voltages cause circulating current flows through the inductive components. A voltage controller is employed that is responsive to the phase voltages to generate voltage modulation signals corresponding to the phase voltages. A plurality of current sharing channels are respectively associated with each of the plurality of inductive components and are configured generate current sharing modulation signals in response to the circulating current flows. The PWM control signals are generated based on modulation signals obtained by combining the current sharing modulation signals and voltage modulation signals. The features, functions, and advantages that have been discussed can be achieved independently in various embodiments or may be combined in yet other embodiments further details of which can be seen referring to the following description and drawings.

BRIEF DESCRIPTION OF THE DRAWINGS

FIGS. 7A-7C are Bode plots for one example of a current sharing controller.

FIGS. 10A-10C are exemplary signal graphs associated with voltages of a power conversion system that does not implement a control system of the type shown and described in connection with one or more of FIGS. 1-9.

FIGS. 11A-11C are exemplary signal graphs associated with voltages of a power conversion system having a control system of the type shown and described in connection with one or more of FIGS. 1-9.

DESCRIPTION

Figure 1:
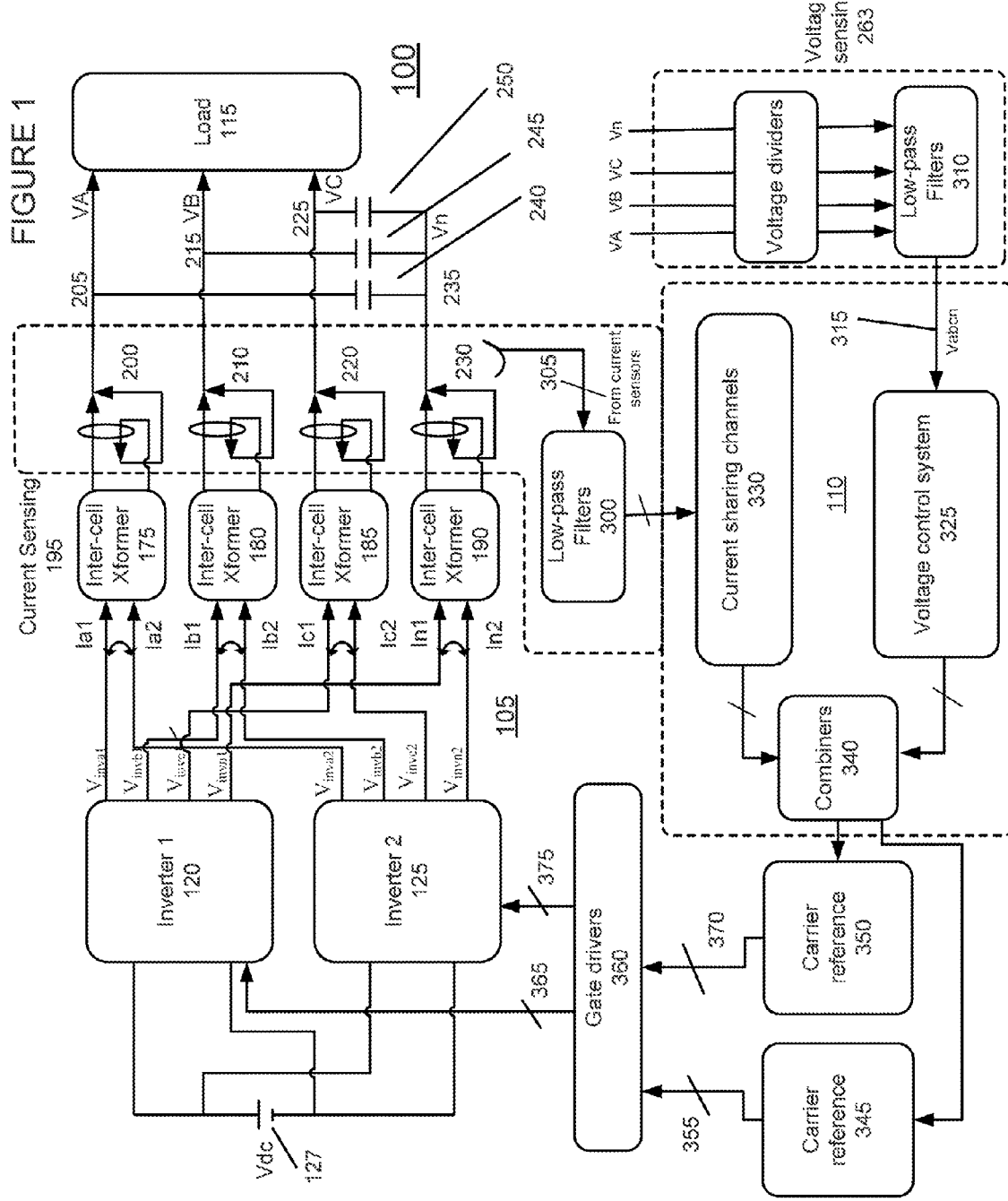
FIG. 1 is a block diagram of a power conversion system that uses inter-cell transformers as inductive components.

FIG. 1 is a block diagram of a power conversion system 100. The power conversion system 100 includes a power drive section 105 and a control system 110. The power conversion system 100 provides multiphase power to load 115. Although the following embodiments are described in the context of a three-phase inverter system that supplies three voltages phased approximately 120° from one another, the embodiments may be extended to inverter systems having more or less than three-phases.

Example Power Drive Section

The power drive section 105 includes a plurality of inverters, each having a plurality of PWM output voltages. The number of PWM output voltages provided by each inverter is at least as large as the number of phases used to drive the load 115.

In the exemplary power conversion system 100 of FIG. 1, the power drive section 105 includes a first inverter 120 and a second inverter 125, which receive DC power from a DC source 127. The first inverter 120 and second inverter 125 share a common DC bus of the DC source 127.

The first inverter 120 provides a first PWM output voltage $V_{inva1}$, a second PWM output voltage $V_{invb1}$, and a third PWM output voltage $V_{invc1}$. Similarly, the second inverter 125 provides a first PWM output $V_{inva2}$, a second PWM output voltage $V_{invb2}$, and a third PWM output voltage $V_{invc2}$. The PWM output voltages are interleaved.

The power conversion system 100 of the example is configured as a four-leg system. As such, the first inverter 120 and second inverter 125 each include neutral PWM output voltages. More particularly, first inverter 120 provides a first neutral PWM output voltage $V_{invn1}$, and second inverter 125 provides a second neutral PWM output voltage $V_{invn2}$. Such three-phase, 4-leg inverters may be used to maintain a desired sinusoidal output voltage waveform on each phase output over a desired range of loading conditions and transients. The power conversion system 100 need not be configured as such a four-leg system but will be discussed in the context of such an architecture.

The power drive section 105 also includes a plurality of inductive components. The inductive components may be in the form of inductors or inter-cell transformers. For purposes of describing the exemplary power conversion system 100, inter-cell transformers are used as the inductive components. However, the inter-cell transformers of FIG. 1 may be replaced by inductors depending on system design parameters.

In FIG. 1, a first inter-cell transformer 175 is coupled to receive the first PWM output voltage $V_{inva1}$ from first inverter 120 and the first PWM output voltage $V_{inva2}$ from second inverter 125. A second inter-cell transformer 180 is coupled to receive the second PWM output voltage $V_{invb1}$ and the second PWM output voltage $V_{invb2}$. A third inter-cell transformer 185 is coupled to receive the third PWM output voltage $V_{invc1}$ and third PWM output voltage $V_{invc2}$. A fourth inter-cell transformer 190 is coupled to receive neutral PWM output voltage $V_{invn1}$ and neutral PWM output voltage $V_{invn2}$.

Figure 2:
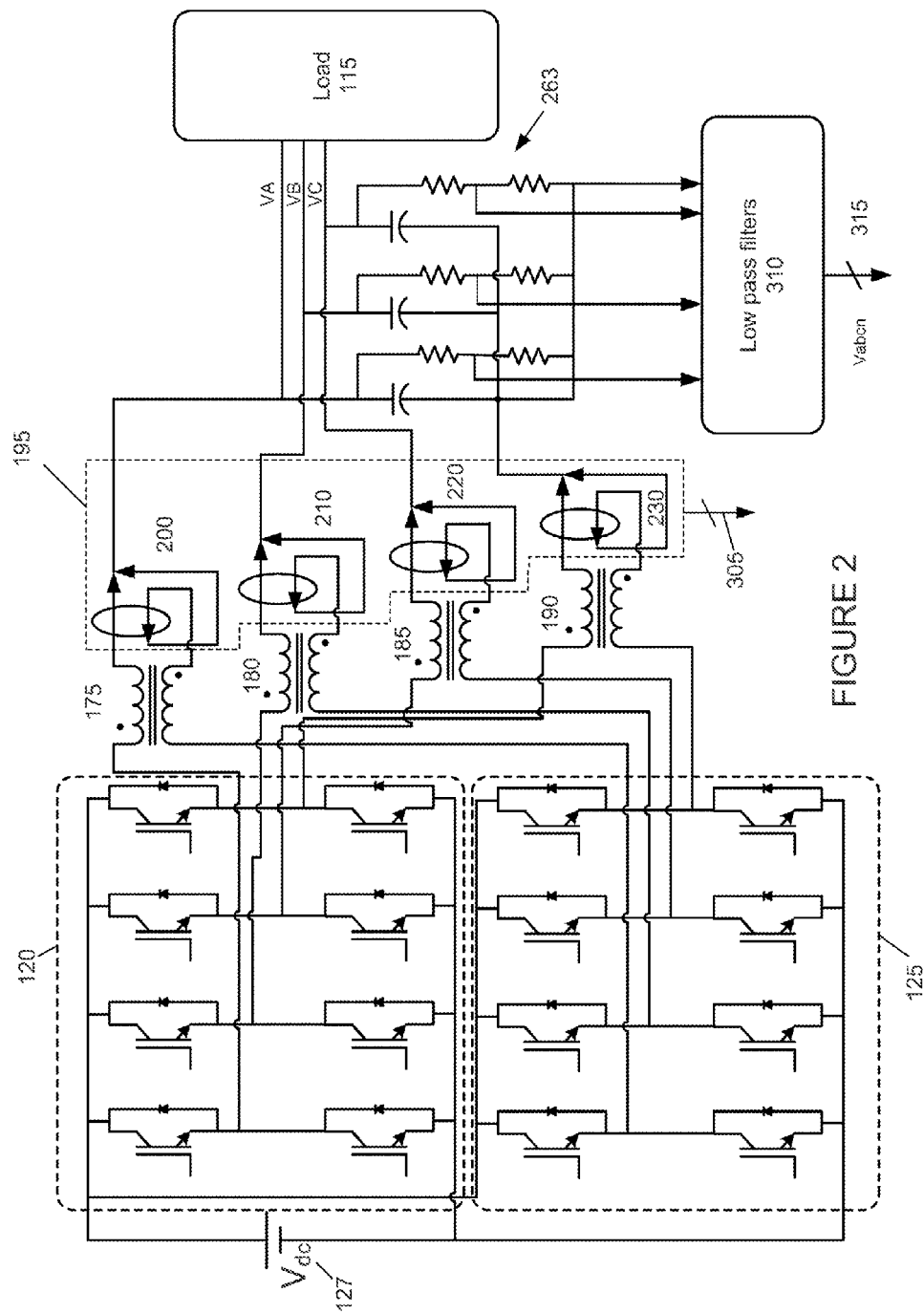
FIG. 2 illustrates one manner in which the inter-cell transformers of FIG. 1 may be coupled within the power conversion system.

FIG. 2 shows one manner in which the inter-cell transformers may be coupled with a power drive section 105. As shown, the output terminals of first inverter 120 and second inverter 125 are connected to respective terminals of the first inter-cell transformer 175, second inter-cell transformer 180, third inter-cell transformer 185, and the fourth inter-cell transformer 190. The dots of the inter-cell transformers show the coupling configuration of the transformer windings. The inter-cell transformers of this example are configured as differential mode inductors. While the magnetizing inductance is used to limit the circulating current, the leakage inductance is used as inductance for an output LC filter respectively associated with each voltage phase. When the inter-cell transformers use a high permeability core, a high magnetizing inductance is obtained. Thus, a small circulating current and high efficiency may be achieved.

Returning to FIG. 1, the parallel operation of inverters 120 and 125 results in circulating currents in each inter-cell transformer. In the example, the circulating current through first inter-cell transformer 175 is the current difference (Ia1−Ia2) between the terminal carrying the first PWM output voltage $V_{inva1}$ and the terminal carrying the first PWM output voltage $V_{inva2}$. The circulating current through second inter-cell transformer 180 is the current difference (Ib1−Ib2) between the terminal carrying the second PWM output voltage $V_{invb1}$ and the terminal carrying the second PWM output voltage $V_{invb2}$. The circulating current through third inter-cell transformer 185 is the current difference (Ic1−Ic2) between the terminal carrying the third PWM output voltage $V_{invc1}$ and the terminal carrying the third PWM output voltage $V_{invc2}$. The circulating current through the fourth inter-cell transformer 190 is the difference (In1−In2) between the terminal carrying neutral PWM output voltage $V_{invn1}$ and the terminal carrying neutral PWM output voltage $V_{invn2}$.

The outputs of the inter-cell transformers are provided to a current sensing circuit 195. Although the current sensing circuit 195 is shown at the outputs of the inter-cell transformers, it may alternatively be placed to monitor the current at the inputs of the inter-cell transformers.

The current sensing circuit 195 may include a plurality of current sensors, each respectively associated with a voltage phase. Here, each inter-cell transformer includes two output terminals. The two output terminal of each inter-cell transformer are coupled to a respective Hall effect current sensor before merging through the Hall effect current sensor in reverse directions at nodes coupled to provide the multiphase power to the load. In this way, the current difference, or the circulating current, between the two output currents from each inter-cell transformer is acquired.

In FIG. 1 and FIG. 2, a first current sensor 200 is coupled to the output terminals of first inter-cell transformer 175, where a first phase supply voltage VA is provided to the load 115 at node 205. A second current sensor 210 is coupled to the output terminals of second inter-cell transformer 180, where a second phase supply voltage VB is provided to the load 115 at node 215. A third current sensor 220 is coupled to the output terminals of third inter-cell transformer 185, where a third phase supply voltage VC is provided to the load 115 at node 225. A fourth current sensor 230 is coupled to the output terminal of fourth inter-cell transformer 190, where a neutral phase voltage Vn is provided to the load 115 at node 235. As such, three-phase supply voltages (VA, VB, VC) are provided to the load 115.

The inter-cell transformers suppress high-frequency circulating current. Low frequency circulating current passes through each inter-cell transformer and is sensed by the current sensing circuit 195 for low-frequency circulating current control.

A capacitor is coupled to each node carrying a voltage to the load 115. The respective capacitor for each voltage supply phase and the inductance of the corresponding inter-cell transformer may be used as a filter for the voltage supply phase. In FIG. 2, a first capacitor 240 is coupled to node 205 and forms a filter with the leakage inductance of the first inter-cell transformer 175 and the fourth inter-cell transformer 190 to filter output phase voltage VA. A second capacitor 245 is coupled to node 215 and forms a filter with the leakage inductance of the second inter-cell transformer 180 and the fourth inter-cell transformer 190 to filter output phase voltage VB. A third capacitor 250 is coupled to node 225 and forms a filter with the leakage inductance of the third inter-cell transformer 185 and the fourth inter-cell transformer 190 to filter output phase voltage VC.

The power drive section 105 may also include a voltage sensing circuit 263. As shown in FIG. 2, the voltage sensing circuit 263 includes a plurality of voltage dividers placed across capacitors 240, 245, and 250 to monitor the magnitudes of supply voltages VA, VB, and VC with respect to Vn. The divided voltage signals are provided to power control system 110. In this example, the voltage divider includes resistors connected across each capacitor.

The power drive section 105 may include low-pass filters respectively associated with the current sensing circuit 195 and the voltage sensing circuit 263. In the example of FIG. 1, low-pass filters 300 are coupled to receive signals from the current sensing circuit 195 along current sensing bus 305. Low-pass filters 310 receive voltages from the voltage sensing circuit 263 and provide output voltages Van, Vbn, and Vcn along voltage sensing bus 315.

The Control System

Referring again to FIG. 1, the control system 110 is coupled to receive voltage signals Van, Vbn, Vcn on voltage sensing bus 315 for provision to a voltage control system 325. The control system 110 is also coupled to receive signals from the current sensing circuit 195 for provision to a plurality of current sharing channels 330. The outputs of the current sharing channels 330 and the outputs of the voltage control system 325 are provided to a plurality of combiners 340. The outputs of the combiners 340 are modulation signals that are obtained by combining current sharing modulation signals generated by the current sharing channel 330 with voltage modulation signals generated by the voltage control system 325. These modulation signals are supplied for comparison to carrier reference signals at carrier reference 345 and carrier reference 350. Carrier reference 345 generates PWM control signals 355 to gate drivers 360, which provide gate drive signals 365 to first inverter 120. In a similar manner, carrier reference 350 generates PWM control signals 370 to gate drivers 360, which provide gate drive signals 375 to second inverter 125.

Exemplary Voltage Control System

Figure 3:
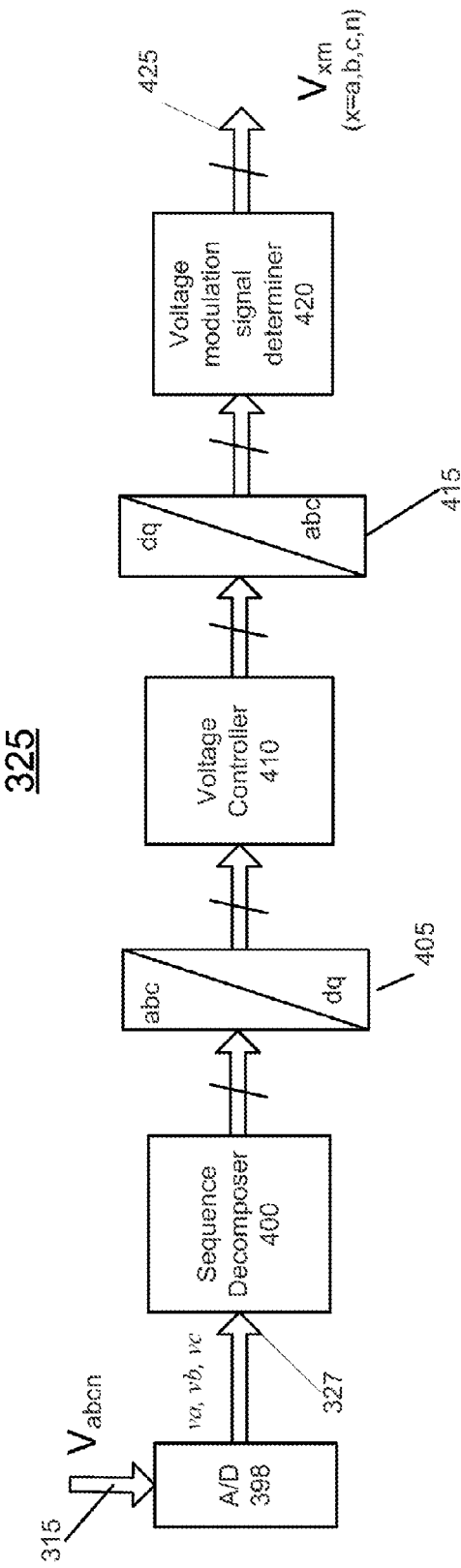
FIG. 3 illustrates a voltage control system that may be employed within the power conversion system of FIG. 1.

An exemplary voltage control system 325 is shown in FIG. 3. In this example, voltage signals Van, Vbn, Vcn are supplied to analog-to-digital converter 398, which converts the received voltage signals to digital signals va, vb, and vc on digital signal bus 327. The digital signals on digital signal bus 327 are provided to a sequence decomposer 400. The signals generated by the sequence decomposer 400 are provided to the input of an abc-to-dq transformer 405. The abc-to-dq transformer 405 transforms the digital signals at its inputs into digital signals that may be manipulated in a dq coordinate system. Such manipulations in this example are executed by a voltage controller 410, which receives the dq signals from the abc-to-dq transformer 405. The voltage controller 410 executes operations on the dq signals from the abc-to-dq transformer 405 to generate corresponding dq output signals to a dq-to-abc transformer 415. A voltage modulation signal determiner 420 operates on the abc signals from the dq-to-abc transformer 415 to generate respective voltage modulation signals Vam, Vbm, Vcm, Vnm, on digital signal bus 425.

Exemplary Sequence Decomposition

As noted, the digital voltage signals on digital signal bus 327 are decomposed into positive, negative, and zero sequences by the sequence decomposer 400. If load 115 is unbalanced, the three-phase voltage and current may oscillate in the dq coordinate system. Accordingly, it may be desirable to decompose the unbalanced voltage and/or current into three symmetric three-phase systems. A general example of how this may be done in any generic three-phase system is illustrated by the following equations:

$$\begin{bmatrix} \bar{x}_A \\ \bar{x}_B \\ \bar{x}_C \end{bmatrix} = \begin{bmatrix} \bar{x}_{A,p} + \bar{x}_{A,n} + \bar{x}_{A,h} \\ \bar{x}_{B,p} + \bar{x}_{B,n} + \bar{x}_{B,h} \\ \bar{x}_{C,p} + \bar{x}_{C,n} + \bar{x}_{C,h} \end{bmatrix}$$

where $(\bar{x}_{A,p}, \bar{x}_{B,p}, \bar{x}_{C,p})$ is the positive sequence vector for the three-phase voltage and/or current output, $(\bar{x}_{A,n}, \bar{x}_{B,n}, \bar{x}_{C,n})$ is the negative sequence vector, and $(\bar{x}_{A,h}, \bar{x}_{B,h}, \bar{x}_{C,h})$ is the zero sequence vector. The vector $(\bar{x}_A, \bar{x}_B, \bar{x}_C)$ corresponds to the three-phase voltage and/or current vector.

The positive, negative, and zero sequences may be obtained using the following equations:

$$\begin{bmatrix} x_{A,p} \\ x_{B,p} \\ x_{C,p} \end{bmatrix} = \text{Re}\left\{ \frac{1}{3}\begin{bmatrix} 1 & a & a^2 \\ a^2 & 1 & a \\ a & a^2 & 1 \end{bmatrix}\begin{bmatrix} \bar{x}_A \\ \bar{x}_B \\ \bar{x}_C \end{bmatrix} \right\} = \text{Re}\left\{ F_p \begin{bmatrix} \bar{x}_A \\ \bar{x}_B \\ \bar{x}_C \end{bmatrix} \right\} = F_p^* \begin{bmatrix} x_A \\ x_B \\ x_C \end{bmatrix}$$

$$\begin{bmatrix} x_{A,n} \\ x_{B,n} \\ x_{C,n} \end{bmatrix} = \text{Re}\left\{ \frac{1}{3}\begin{bmatrix} 1 & a^2 & a \\ a & 1 & a^2 \\ a^2 & a & 1 \end{bmatrix}\begin{bmatrix} \bar{x}_A \\ \bar{x}_B \\ \bar{x}_C \end{bmatrix} \right\} = \text{Re}\left\{ F_n \begin{bmatrix} \bar{x}_A \\ \bar{x}_B \\ \bar{x}_C \end{bmatrix} \right\} = F_n^* \begin{bmatrix} x_A \\ x_B \\ x_C \end{bmatrix}$$

$$\begin{bmatrix} x_{A,h} \\ x_{B,h} \\ x_{C,h} \end{bmatrix} = \text{Re}\left\{ \frac{1}{3}\begin{bmatrix} 1 & 1 & 1 \\ 1 & 1 & 1 \\ 1 & 1 & 1 \end{bmatrix}\begin{bmatrix} x_A \\ x_B \\ x_C \end{bmatrix} \right\} = \text{Re}\left\{ F_h \begin{bmatrix} x_A \\ x_B \\ x_C \end{bmatrix} \right\} = F_h^* \begin{bmatrix} x_A \\ x_B \\ x_C \end{bmatrix}$$

where $a = e^{j2\pi/3}$.

Figure 4:
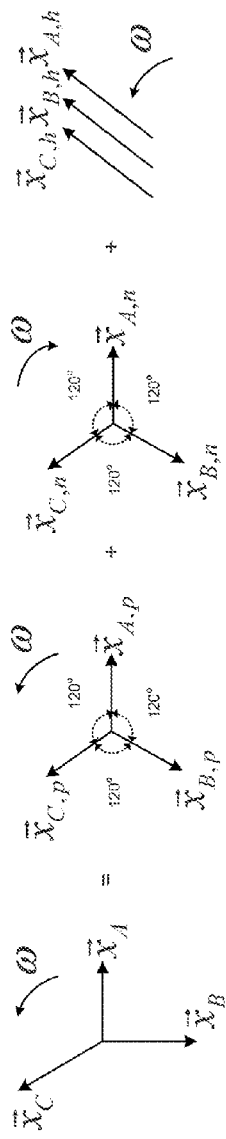
FIG. 4 illustrates one manner of executing sequence decomposition.

Assuming $x_{ABC} = x_{ABC_{max}} \cos(\omega t + \phi_{ABC})$, then $\bar{x}_{ABC} = x_{ABC_{max}}[\cos(\omega t + \phi_{ABC}) + j \times \sin(\omega t + \phi_{ABC})]$. This sequence decomposition is illustrated in graphical form in FIG. 4 and is applicable to the power conversion system 100.

Figure 5:
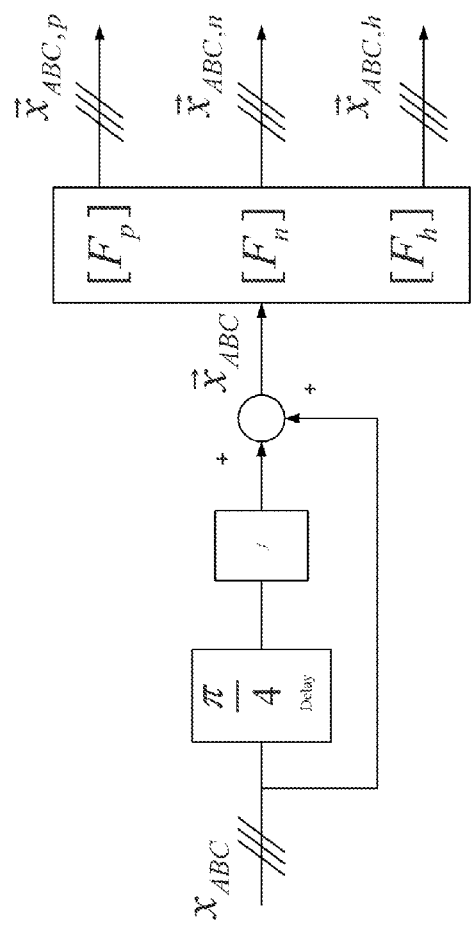
FIG. 5 illustrates an algorithm configured to execute the sequence decomposition shown in FIG. 4.

To obtain the vector form of the voltage and/or current, the imaginary part of the vector is obtained by executing a quarter of a fundamental cycle delay on the three-phase voltage and/or current time-domain signals. A block diagram showing one implementation of such a sequence decomposition algorithm configured to execute the mathematical operations above is illustrated in FIG. 5.

Example of Abc/Dq Transformations

A direct-quadrature-zero (dq) transformation is a mathematical transformation used to simplify the analysis of three-phase circuits. With balanced three-phase circuits, application of the dq transform reduces the three AC quantities to two DC quantities. Simplified calculations can then be carried out on these imaginary DC quantities before performing the inverse transform to recover the modified three-phase AC results. As such, dq transformation operations may simplify calculations executed by the voltage control system 325.

One example of a dq transform as applied to a three-phase voltage is shown here in matrix form:

$$V_{abc} = T^{-1} V_{dq0} = \sqrt{\frac{2}{3}} \begin{bmatrix} \cos(\theta) & -\sin(\theta) & \frac{\sqrt{2}}{2} \\ \cos\left(\theta - \frac{2\pi}{3}\right) & -\sin\left(\theta - \frac{2\pi}{3}\right) & \frac{\sqrt{2}}{2} \\ \cos\left(\theta + \frac{2\pi}{3}\right) & -\sin\left(\theta + \frac{2\pi}{3}\right) & \frac{\sqrt{2}}{2} \end{bmatrix} \begin{bmatrix} V_d \\ V_q \\ V_o \end{bmatrix}$$

This transform is executed by the abc-to-dq transformer 405 on the received voltages. An inverse of this transform is executed by the dq-to-abc transformer 415. The inverse transform is:

$$V_{dqo} = TV_{abc} = \sqrt{\frac{2}{3}} \begin{bmatrix} \cos(\theta) & \cos\left(\theta - \frac{2\pi}{3}\right) & \cos\left(\theta + \frac{2\pi}{3}\right) \\ -\sin(\theta) & -\sin\left(\theta - \frac{2\pi}{3}\right) & -\sin\left(\theta + \frac{2\pi}{3}\right) \\ \frac{\sqrt{2}}{2} & \frac{\sqrt{2}}{2} & \frac{\sqrt{2}}{2} \end{bmatrix} \begin{bmatrix} V_a \\ V_b \\ V_c \end{bmatrix}$$

Exemplary Voltage Controller

The voltage controller 410 may execute proportional-integral (PI) operations on the dq signals received from the abc-to-dq transformer 405. To this end, voltage controller 410 may include a PI controller having the following frequency response:

$$C(s) = K_p + \frac{K_i}{s}$$

In certain applications, the PI controller may be modified to meet both system stability and dynamic response requirements. Hence, a "two-pole controller" having two poles may be used. More particularly, the two-pole controller may have the following frequency response:

$$C(s) = \frac{K_v(s + \omega_{v1})}{s \times (s + \omega_{v2})}$$

Such a two-pole controller may provide higher bandwidth and higher magnitude/phase margin for the voltage controller 410 than the PI controller in the first example.

In this two-pole controller, $\omega_{v2}$ is selected below the overshoot frequency of system voltage-to-control magnitude bode diagram, to provide high damping, hence ensure high magnitude margin for the system. The value for $\omega_{v1}$ is selected to obtain the desired phase margin of the voltage-to-control system (60 degrees in the three-phase system described here), and $K_v$ is selected as a trade-off between system robustness and bandwidth (response speed). The values for $K_p$ and $K_i$ determined the gain and zero of the transfer function. The gain is selected as a trade-off between system robustness and bandwidth (response speed). The zero is selected to obtain desired phase margin.

Example of Current Sharing Channel

Figure 6:
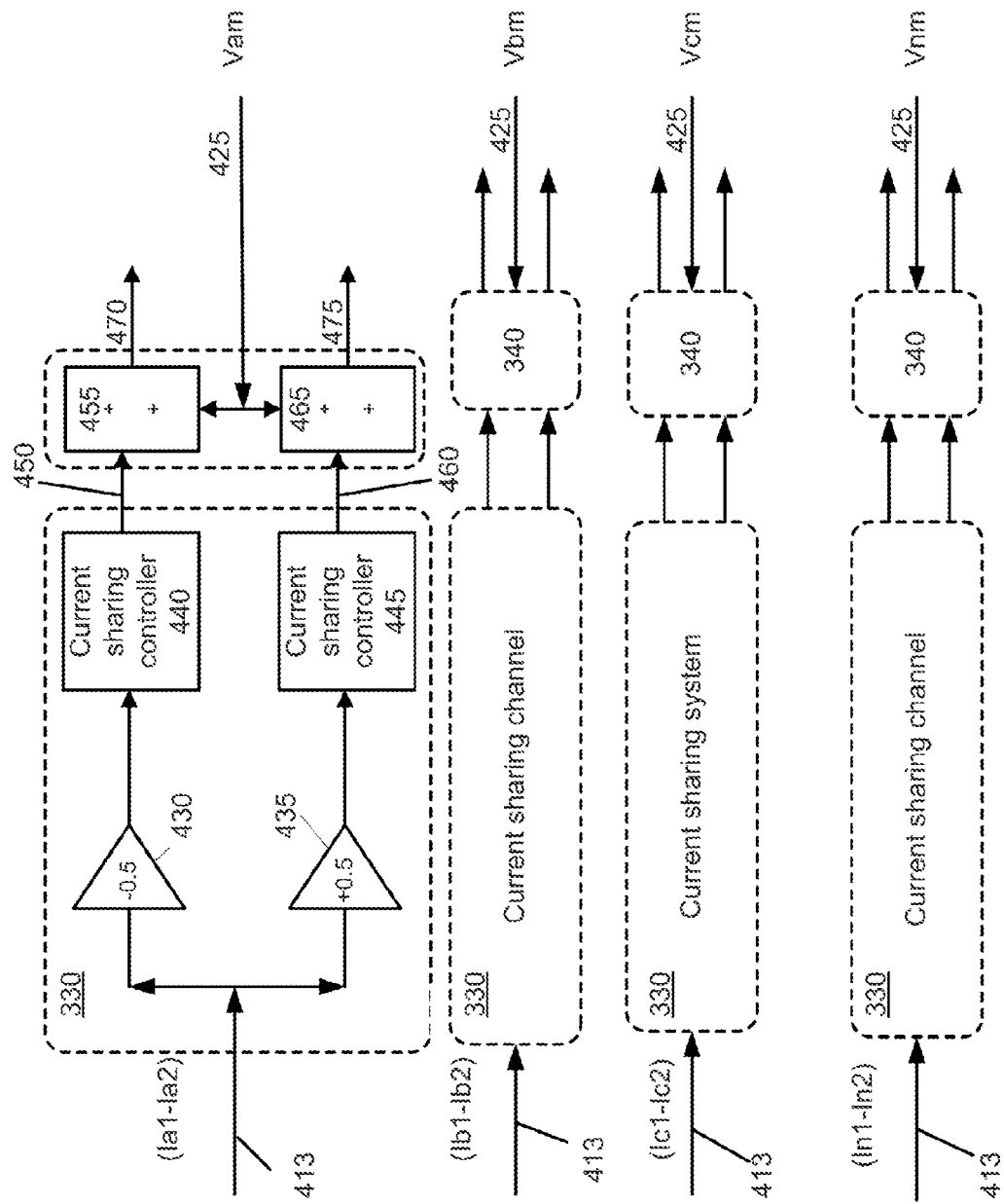
FIG. 6 illustrates current sharing channels that may be employed in the power conversion system of FIG. 1.

An example of the current sharing channel 330 is illustrated in FIG. 6. As shown, four differential digital circulating current signals are received on separate lines of bus 413. Each differential circulating current is respectively associated with each inter-cell transformer and provided to a respective current sharing channel 330. For simplicity, only the current sharing channel 330 associated with circulating current (Ia1–Ia2) of the first inter-cell transformer 175 is described. The remaining current sharing channels 330 associated with the second inter-cell transformer 180, the third inter-cell transformer 185, and the fourth inter-cell transformer 190 have the same structure. Two or more of the current sharing channels 330 for different voltage phases may operate in parallel in a generally concurrent manner.

The digital signals on bus 413 corresponding to circulating current signals (Ia1–Ia2) are provided to the input of a first amplifier 430 and to the input of a second amplifier 435. The first amplifier 430 multiplies the circulating current signals by a factor of –0.5, while the second amplifier 435 multiplies the circulating current signals by a factor of +0.05. The output of the first amplifier 430 is provided to the input of a first current sharing controller 440, and the output of the second amplifier 435 is provided to an input of a second current sharing controller 445. The output 450 of the first current sharing controller 440 is provided to an input of a first combiner 455, and the output 460 of the second current sharing controller 445 is provided to an input of a second combiner 465. The signal on output 450 corresponds to a current modulation signal as generated by current sharing controller 440. The signal on output 460 corresponds to a current modulation signal as generated by the second current sharing controller 445. The amplifiers 430 and 435 place the current modulation signals out of phase with one another.

Besides the current modulation signals, each current sharing channel 330 receives a respective voltage modulation signal for a given phase of the three-phase voltage from bus 425. Regarding the circulating current (Ia1–Ia2) of the first inter-cell transformer 175, the corresponding voltage modulation signal Vam is provided to and input of first combiner 455 and to an input of the second combiner 465. The first combiner 455 provides a first modulation signal at output 470 corresponding to a sum of the current modulation signal generated by current sharing controller 440 and the voltage modulation signal Vam generated by voltage control system 325. The second combiner 465 generates a second modulation signal at output 475 corresponding to a sum of the current modulation signal generated by the second current sharing controller 445 and the voltage modulation signal Vam generated by voltage control system 325. The modulation signal at output 470 may be provided to carrier reference circuit 345 for comparison with a corresponding carrier signal to generate the PWM control signals 355 used in controlling the first PWM output voltage $V_{inva1}$ of the first inverter 120. The modulation signal at output 475 may be provided to carrier reference circuit 350 for comparison with a corresponding carrier signal to generate PWM control signals 370 used in controlling the first PWM output voltage $V_{inva2}$ of the second inverter 125. In each instance, the PWM control signals are provided to the gate drivers 360 to the respective inverters.

Example of Current Sharing Controller

One example of a structure for a current sharing controller 440 (C(s)) is exemplified in the following equation:

$$C(s) = \underbrace{\left(k_p + \frac{k_i}{s}\right)}_{DC} + \underbrace{\left(K_{lo} + \frac{K_l s}{s^2 + \Delta\omega_l s + \omega_l^2}\right)}_{\text{Low frequency}} + C_{ph} * \underbrace{\left(K_{f0} + \frac{K_f s}{s^2 + \Delta\omega_f s + \omega_f^2}\right)}_{\text{Fundamental frequency}}$$

where $$C_{ph} = \frac{k(s + \omega_1)}{(s + \omega_2)^2}.$$

Here, $\omega_l$ defines a center frequency of a low-frequency resonant filter, $\omega_f$ defines a center frequency of a resonant fundamental frequency filter, $\Delta\omega_l$ defines a bandwidth of the resonant low-frequency filter, $\Delta\omega_f$ defines a bandwidth of the resonant fundamental frequency filter, $K_{l0}$ and $K_{f0}$ define magnitudes of pass bands of the resonant low-frequency filter and resonant fundamental frequency filter, respectively. $K_l$ and $K_f$ define peak gains of the resonant low-frequency filter and resonant fundamental frequency filter, respectively, and $C_{ph}(s)$ is a phase delay compensator providing phase compensation around the fundamental frequency. The resonant fundamental frequency controller has a center frequency proximate a fundamental frequency of the supply voltage of each phase of the multiphase (three-phase) voltage. It may also be viewed that each current sharing channel 330 has the same frequency response vis-à-vis the respective current sharing controllers.

The values for $k_p$ and $k_i$ determine the gain and zero of the transfer function. The values are selected based on desired system robustness. The values of $k_p$ and $k_i$ are selected to ensure low cut off frequency of the "DC" part of C(s) to achieve the desired system robustness.

In a three-phase power system operating at 400 Hz, the value 400 Hz is assigned as the value of $\omega_f$, which corresponds to the fundamental frequency. The value for $\omega_l$ is selected so that it is at a low frequency, such as in a range from about 1 to 20 Hz. The value for $\Delta\omega_l$ should be a relatively large number compared to $\Delta\omega_f$, which should be a small number. The values for $K_{l0}$ and $K_{f0}$ are selected to obtain a unity gain in the non-pass frequency band for the "low-frequency" and the "fundamental frequency" parts of C(s). The values for $K_l$ and $K_f$ are selected to obtain high peak values at the center frequency of the low-frequency and fundamental frequency resonant controller, while the effect of $\Delta\omega l$ and $\Delta\omega_f$, Kl0 and $K_{f0}$ on these values may also be considered. To this end, increasing $K_l$ and $K_f$ will have a similar effect as increasing $\Delta\omega_l$ and $\Delta\omega_f$ (increasing the pass bandwidth of the low-frequency and fundamental frequency resonant controllers), or increasing $K_{l0}$ and $K_{f0}$ (increasing the gain in the non-pass bandwidth of the low-frequency and fundamental frequency resonant controllers).

The parameters of the phase-delay compensator $C_{ph}(s)$ are selected based on the phase delay caused by the current sensing circuit. For example, a 10-100 micro-second time delay could be caused by the current sensing circuit, which is equals to 1.44°-14.4° at fundamental frequency of 400 Hz. The phase delay compensator $C_{ph}(s)$ thus compensates for a 20-30 degree phase delay at the fundamental frequency $\omega_{f\,assists}$ in ensuring system stability.

The low cut-off frequency of the "DC" part of C(s) assists in providing system stability. The $\omega_l$ defining the center frequency of the low-frequency resonant filter of C(s) can be selected so that it is in a range between the cut-off frequency of the "DC" part and the 400 Hz value of $\omega_f$. For example, $\omega_l$ may be in a range of 1 to 20 Hz, with as pass bandwidth in a range between about 10 Hz and 30 Hz. The center frequency of "fundamental frequency" part of C(s), as noted above, is at 400 Hz, and may have a very small pass bandwidth. The phase angle of the phase delay compensator $C_{ph}(s)$ at 400 Hz should be selected to compensate for the time delay caused by the current sensing circuit, and the magnitude before the cut-off frequency should be as close to unity as possible.

Using the foregoing guidelines, the values of C(s) for one embodiment of a three-phase system are:

$$C(s) = \left(0.1 + \frac{50}{s}\right) + \left(1 + \frac{400s}{s^2 + 0.01s + (32\pi)^2}\right) +$$

$$C_{ph} * \left(0.9 + \frac{1000s}{s^2 + 2.483 * 10^{-11}s + (800\pi)^2}\right)$$

where $$C_{ph} = \frac{92586(s + 1200\pi)}{(s + 6000\pi)^2}$$

FIGS. 7A-7C are Bode plots for the current sharing controller 440 (C(s)). FIG. 7C shows the frequency and phase response associated with each current sharing controller, where the upper diagram 485 is in the s-plane coordinate system and shows the magnitude frequency response of a current sharing controller, and diagram 490 is the phase response of the current sharing controller 440. In this example, the frequency and phase response of the DC filter is shown at 495. The frequency and phase response of the low-frequency resonant filter is shown at 500. The frequency and phase response of the resonant fundamental frequency filter is shown at 505.

FIG. 7B shows the frequency and phase response associated with the phase delay compensator $C_{ph}$. More particularly, the upper diagram 510 shows the magnitude of the frequency response at 515, while diagram 520 shows the phase response at 525.

FIG. 7C are diagrams showing the overall composite frequency and phase responses of the current sharing controller, including that of the phase delay compensator. More particularly, the upper diagram 525 shows the composite magnitude frequency response, while lower diagram 530 shows the composite phase response. As illustrated, there is a peak 535 in the response shown in diagram 525 at the fundamental frequency of the voltage signals used to drive the load. Here, the current sharing controllers are designed for an aircraft, so the overall response the peak 535 occurs at a frequency of approximately 400 Hz. The composite phase also shows a peak phase shift proximate 537 at the fundamental frequency.

Digital Signal Processor (DSP) Implementation

Figure 8:
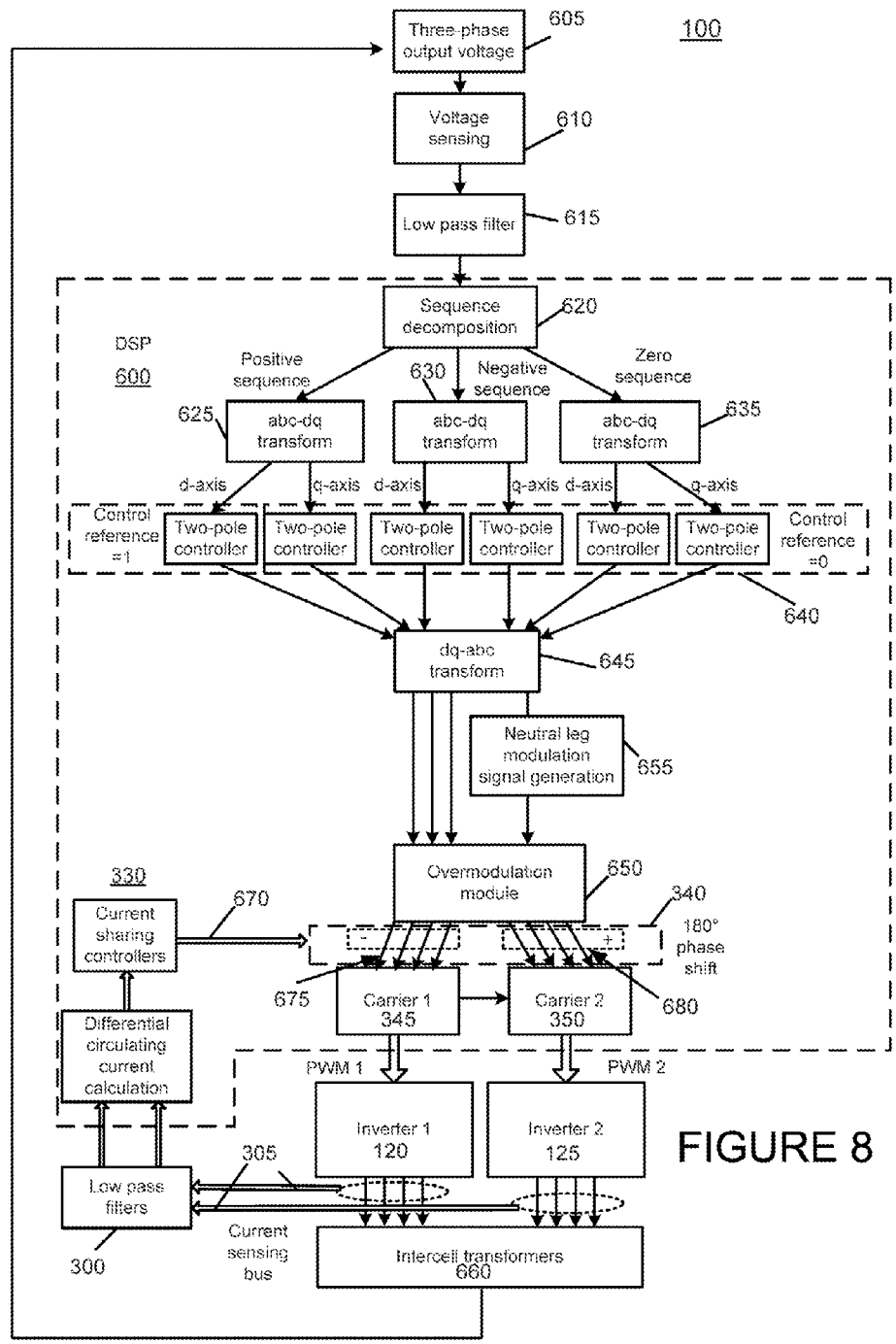
FIG. 8 illustrates a power conversion system in which various signal processing operations take place in a digital signal processor (DSP).

FIG. 8 illustrates a power conversion system 100 in which various signal processing operations take place in a DSP 600. In the power conversion system 100, the three-phase output voltage is provided to the load at operation 605, and these output voltages are sensed at voltage sensing operation 610 and optional low pass filtering may take place at filtering operation 615 before the signals are provided to an analog-to-digital converter (not shown) of the DSP 600 for manipulation in the digital domain.

Once the sensed voltages are converted to digital signals, they are subject to a sequence decomposition operation 620. The sequence decomposition operation 620 includes dividing the digital signals into positive, negative, and zero sequences. Such operations are described above in connection with the sequence decomposer 400 of FIG. 3.

Each positive, negative, and zero sequence is subject to individual abc-dq transformations. In this example, the positive sequences are subject to transformation operations executed at abc-dq transformer 625. The negative sequences are subject to transformation operations executed at abc-dq transformed 630. The zero sequences are subject to transformation operations executed by abc-dq transformer 635.

The d-axis and q-axis output of each abc-dq transformer 625, 630, and 635 are provided to two a voltage controller operating in the dq domain. In the illustrated example, the dq signals are provided to respective ones of a plurality of two-pole controllers 640. The operations executed by the two-pole controllers 640 may be those described above in connection with the PI controllers used in the voltage controller 410 of FIG. 3.

The outputs of the two-pole controllers 640 are subject to a dq-abc transform operation at 645. The resulting abc signals are used in connection with generating modulation signals for each voltage phase of the three output supply voltages. The abc signals are provided directly to over modulation module 650 for execution of an over modulation technique. The over modulation technique may be any of several such techniques.

The abc transform of the neutral leg voltage is provided to a neutral leg modulation signal generator 655 before being processed by the over modulation module 650. The signals provided at the outputs of the over modulation module 650 correspond to the voltage modulation signals of the voltage control system 325 described above in connection with FIGS. 1, 3, and 6.

A plurality of inter-cell transformers 660 are used to provide the three-phase output supply voltages to the load in response to PWM power signals received from the first inverter 120 and second inverter 125. Signals corresponding to the circulating currents flowing through each inter-cell transformer of a plurality of inter-cell transformers 660 are on current sensing bus 305 for analog-to-digital conversion within the DSP 600. The circulating current sensing may be accomplished in the manner shown in FIG. 1 and FIG. 2. The signals on current sensing bus 305 are optionally provided to low-pass filters 300 before undergoing the analog-to-digital conversion within the DSP 600. Because the circulating current contains double of the switching frequency signal and since the sampling frequency of digital controllers may be limited, close control of the sampling event timing of the digital controller may be needed. For example, sampling timing may be triggered at the peaks of PWM carrier signals to avoid introduction of a fake fundamental frequency component into the sampled circulating current.

In FIG. 8, only a single current sharing channel 330 is shown. However, DSP 600 executes operations for a plurality of current sharing channels 330, each respectively associated with at least one corresponding inter-cell transformer of the plurality of inter-cell transformers 660.

The current modulation signals are provided along a path 670 to inputs of digitally implemented combiner circuits 340, where they are combined with corresponding voltage modulation signals to generate a pair of modulation signals for each phase of the three-phase voltage. As shown in FIG. 8, a first plurality of modulation signals 675 are provided from combiner circuits 340 to carrier reference circuit 345, and a second plurality of modulation signals 680 are provided from combiner circuits 340 to the carrier reference circuit 350. The outputs of carrier reference circuit 345 are used as PWM control signals 355 to control operation of the first inverter 120 (gate drivers 360 not shown). The outputs of carrier reference circuit 350 are used as PWM control signals 370 to control operation of the second inverter 125 (gate drivers 360 not shown).

Exemplary Control Method

Figure 9:
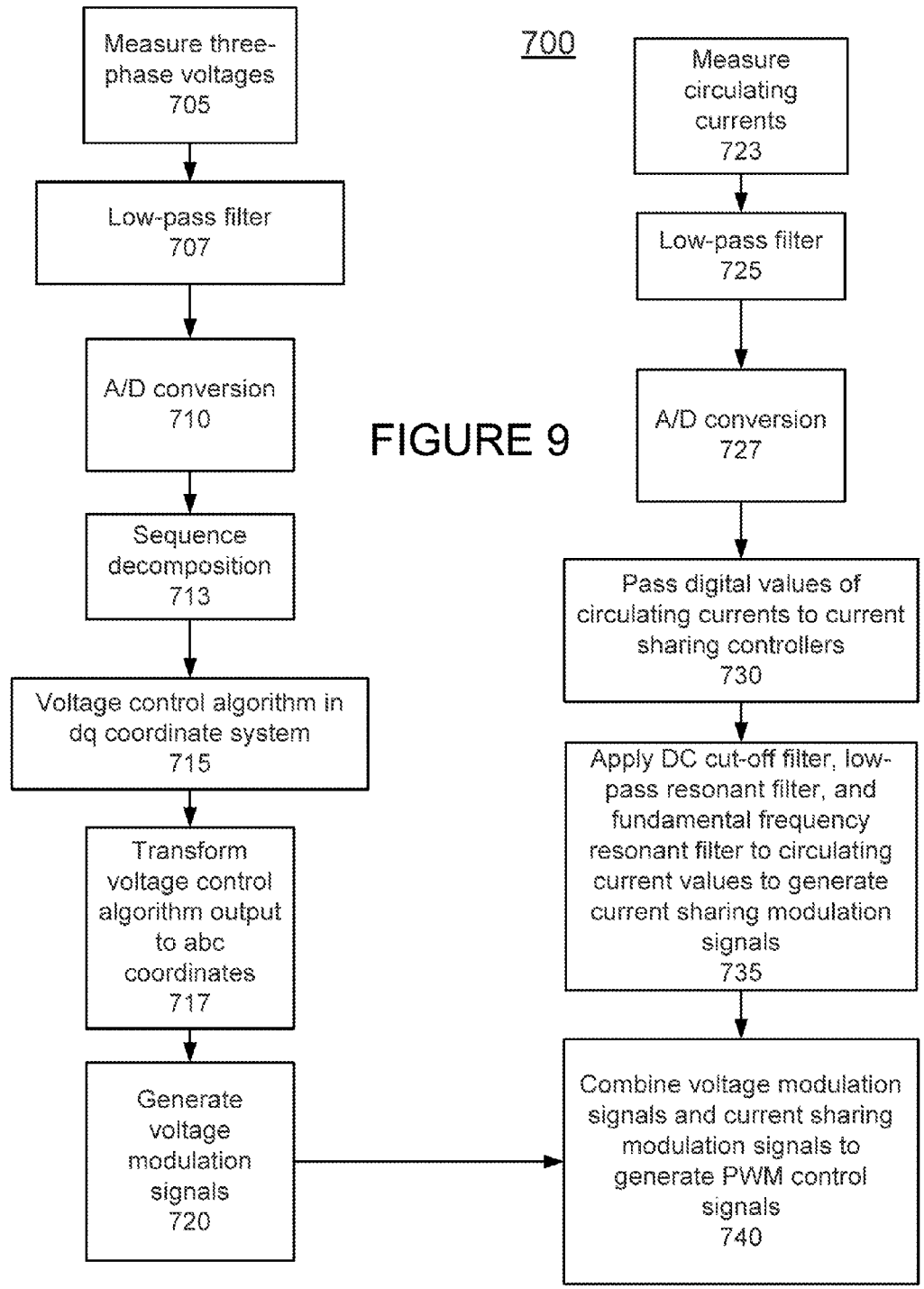
FIG. 9 shows a method for controlling a power conversion system.

FIG. 9 shows a method 700 for controlling a power conversion system. As shown, 3-phase voltages are measured at 705 and provided to an optional low-pass filter at 707. The analog output of the low pass filter is converted to digital signals at 710, which are then subject to sequence decomposition at 713. A voltage control algorithm is executed, in the dq coordinate system, on the decomposed signals at 715. The outputs of the voltage control algorithm are transformed to abc coordinates at 717. The resulting abc signals are used to generate voltage modulation signals at 720.

In parallel with the operations shown at 705 through 720, the method 700 conducts operations relating to the circulating currents flowing through the inter-cell transformers. At 723, the circulating currents are measured and are subject to an optional low-pass filter operation at 725. The filtered analog signals are converted to digital signals at 727. The digital values of the circulating currents are passed to current sharing controllers at 730. The current sharing controllers execute a number of operations at 735. Among these, the current sharing controllers apply a DC cut-off filter, a low-pass resonant filter, and a fundamental frequency resonant filter to generate current sharing modulation signals. At 740, the voltage modulation signals from 720 and the current sharing modulation signals from 735 are used to generate PWM control signals. The PWM control signals are provided to gate driver circuits, which provide switching voltages to inverters used in the power conversion system.

Exemplary Simulations

FIGS. 10A-10B are exemplary signal graphs associated with voltages ($V_{inva1}, V_{Invb1}, V_{invc1}$ and $V_{inva2}, V_{invb2}, V_{invc2}$) of a power conversion system that does not implement the control scheme set forth above. In FIG. 10A, phase current 750 corresponds to the current generated because of voltage outputs $V_{inva1}, V_{invb1}, V_{invc1}$ from the inverter 120. Phase current 755 corresponds to the current generated because of voltage outputs $V_{inva2}, V_{invb2}, V_{invc2}$ from the second inverter 125. The resulting circulating currents 760 through the corresponding inter-cell transformers 175, 180, and 185 have a low-frequency component that varies slowly over time in comparison to the fundamental frequency. This results in a corresponding large variation in the flux 765 (FIG. 10C) of the cores of the inter-cell transformers 175, 180, and 185, which subjects the cores of the inter-cell transformers to potential saturation and limits the ability to design the inter-cell transformers using high permeability core materials.

A similar analysis applies to the currents associated with neutral voltage Vn signals, which are shown in FIG. 10B. More particularly, phase current 770 corresponds to the current generated because of voltage output $V_{invn1}$ from the first inverter 120, while phase current 775 corresponds to the current generated because of the voltage $V_{invn2}$ from the second inverter 125. The resulting circulating current 780 through the fourth inter-cell transformer 190 has a low-frequency component that varies slowly over time. This results in a corresponding large variation in the flux 785 (FIG. 10C) of the fourth inter-cell transformer 190, which subjects the core of the fourth inter-cell transformer 190 to potential saturation, limiting the use of high permeability of the core materials in the fourth inter-cell transformer 190.

FIGS. 11A-11B are exemplary signal graphs associated with voltages ($V_{inva1}, V_{invb1}, V_{invc1}$ and $V_{inva2}, V_{invb2}, V_{invc2}$) of the power conversion system 100 having the control scheme set forth above. In FIG. 11a, phase current 800 corresponds to the current generated because of voltages $V_{inva1}, V_{invb1}, V_{invc1}$ from the first inverter 120, while phase current 805 corresponds to the current generated because of the voltages $V_{inva2}, V_{invb2}, V_{invc2}$ from the second inverter 125. As shown, the low-frequency component in FIGS. 10A-10B is missing from the resultant circulating current 810 through the corresponding inter-cell transformers 175, 180, and 185. As a result, there are relatively no low-frequency variations in the flux 815 (FIG. 11C) of the inter-cell transformers and they may be designed using high permeability core materials.

A similar analysis applies regarding the neutral voltage Vn of the power conversion system 100. In FIG. 11B, phase current 820 corresponds to the current generated because of voltage $V_{invn1}$ from the first inverter 120, while phase current 825 corresponds to the current generated because of the voltage $V_{invn2}$ from the second inverter 125. As shown, the low-frequency component in FIGS. 10B-10C is missing from the resultant circulating current 830 through the fourth inter-cell transformer 190. As a result, there are relatively no low-frequency variations in the flux 835 (FIG. 11C) of the fourth inter-cell transformer 190 and it may be designed using high permeability core materials.

Exemplary Application

Figure 12:
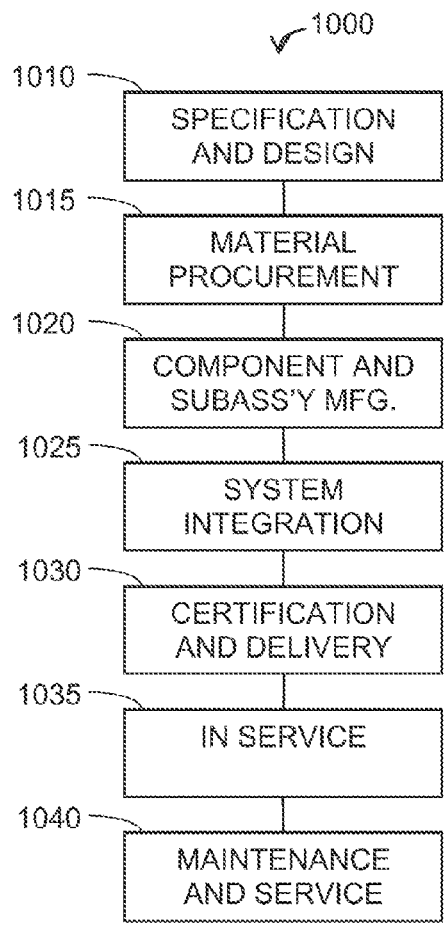
FIG. 12 is a flow chart illustrating how the power conversion system may be incorporated in the context of the design and operation of an aircraft.
Figure 13:
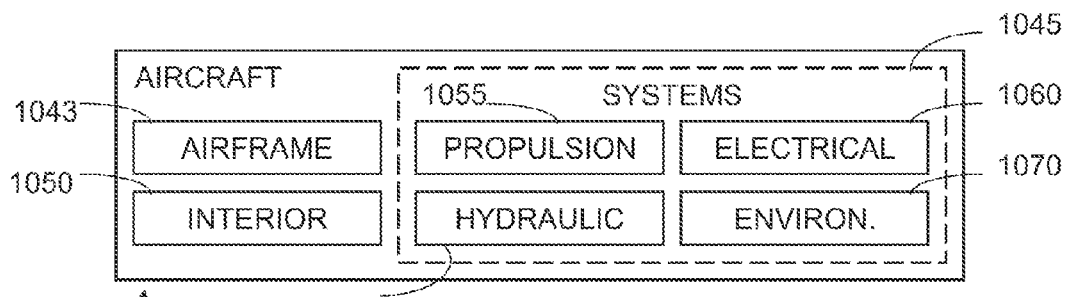
FIG. 13 is a block diagram illustrating an aircraft that incorporates the power conversion system.

Embodiments of the power conversion system 100 may be used in a wide variety of applications. FIG. 12 describes how the power conversion system 100 is incorporated in the context of the exemplary method 1000. FIG. 13 describes how the power conversion system 100 may be incorporated into an aircraft 1005. During pre-production, exemplary method 1000 may include specification and design 1010 of the aircraft 1005 and material procurement 1015. During production, component and subassembly manufacturing 1020 and system integration 1025 of the aircraft 1005 takes place. Thereafter, the aircraft 1005 may go through certification and delivery 1030 to be placed in service 1035. While in service by a customer, the aircraft 1005 is scheduled for routine maintenance and service 1040 (which may also include modification, reconfiguration, refurbishment, and so on of the power conversion system 100).

Each of the operations of exemplary method 1000 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 13, the aircraft 1005 produced by the exemplary method 1000 may include an airframe 1043 with a plurality of high-level systems 1045 and an interior 1050. Examples of high-level systems 1045 include one or more of a propulsion system 1055, an electrical system 1060, a hydraulic system 1065, and an environmental system 1070. The electrical system 1060 may include one or more power conversion systems 100 of the type disclosed. The power conversion system 100 may provide power to many the high-level systems or other systems of the aircraft 1005. Further, the power conversion system 100 may be included as part of the subject matter of the method of FIG. 11. Although an aerospace example is shown, the principles described may apply to other industries, such as the automotive industry, computer industry, and the like.

Apparatus and methods embodied herein may be employed during any one or more of the stages of the exemplary method 1000. For example, components or subassemblies corresponding to production process 1010 may be fabricated or manufactured in a manner similar to components or subassemblies produced while the aircraft 1005 is in service. Also, one or more apparatus embodiments, method embodiments, or a combination thereof may be utilized during the production stages, for example, by substantially expediting assembly of or reducing the cost of an aircraft 1005. Similarly, one or more of apparatus embodiments, method embodiments, or a combination thereof may be utilized while the aircraft 1005 is in service, for example and without limitation, to maintenance and service 1040.

The invention claimed is:

1. A power conversion system configured to supply multiphase power having a phase voltage respectively associated with each phase of the multiphase power, the power conversion system comprising:
    a plurality of inverters configured to generate PWM output voltages for each phase voltage in response to PWM control signals;
    a plurality of inductive components configured to receive the PWM output voltages to generate the phase voltages, wherein the PWM output voltages result in a plurality of circulating current flows in the plurality of inductive components;
    a voltage controller responsive to generate voltage modulation signals for each phase voltage;
    a plurality of current sharing channels respectively associated with each of the plurality of inductive components, wherein the plurality of current sharing channels are configured to generate current sharing modulation signals in response to the plurality of circulating current flows; and
    a carrier reference circuit configured to generate the PWM control signals in response to modulation signals, wherein the modulation signals are obtained by combining the current sharing modulation signals and voltage modulation signals.

2. The power conversion system of claim 1, wherein the inductive components are a plurality of inter-cell transformers.

3. The power conversion system of claim 1, wherein the inductive components are a plurality of inductors.

4. The power conversion system of claim 2, wherein the plurality of inverters comprise first and second inverters, and wherein the first and second inverters generate interleaved three-phase PWM output voltages.

5. The power conversion system of claim 4, wherein the plurality of inter-cell transformers are configured to provide three-phase supply voltages using interleaved three-phase PWM output voltages from first and second inverters.

6. The power conversion system of claim 4, wherein each of the first and second inverters further provide a neutral phase voltage.

7. The power conversion system of claim 1, further comprising a current sensing circuit having a plurality of current sensors configured to provide circulating current signals to the current sharing channels for each of the plurality of inductive components.

8. The power conversion system of claim 1, wherein the current sharing channels comprise a resonant fundamental frequency controller having a center frequency proximate a fundamental frequency of the phase voltages.

9. The power conversion system of claim 1, wherein the current sharing channels have a frequency transform response generally corresponding to:

$$C(s) = \underbrace{\left(k_p + \frac{k_i}{s}\right)}_{DC} + \underbrace{\left(K_{lo} + \frac{K_l s}{s^2 + \Delta\omega_l s + \omega_l^2}\right)}_{\text{Low frequency}} + C_{ph} * \underbrace{\left(K_{f0} + \frac{K_f s}{s^2 + \Delta\omega_f s + \omega_f^2}\right)}_{\text{Fundamental frequency}}$$

where $$C_{ph} = \frac{k(s + \omega_1)}{(s + \omega_2)^2}$$

wherein $\omega_l$ defines a center frequency of a low-frequency filter, $\omega_f$ defines a center frequency of a fundamental frequency filter, $\Delta\omega_l$ defines a bandwidth of the low-frequency filter, $\Delta\omega_f$ defines a bandwidth of the fundamental frequency filter, $K_{l0}$ and $K_{f0}$ define magnitudes of pass bands of the low-frequency filter and fundamental frequency filter, respectively, $K_l$ and $K_f$ define peak gains of the low-frequency filter and fundamental frequency filter, respectively, and $C_{ph}(s)$ is a phase delay compensator providing phase compensation around the fundamental frequency.

10. The power conversion system of claim 1, further comprising a DC power source configured to provide input power to the plurality of inverters, wherein the plurality of inverters share a common DC bus.

11. A control system for a power conversion system comprising:

a voltage controller responsive to three-phase voltage signals to generate corresponding voltage modulation signals;

current sharing channels responsive to a plurality of circulating currents from a plurality of inductive components, wherein the inductive components are associated with respective phases of the three-phase voltage signals, wherein the current sharing channels generate current sharing modulation signals respectively associated with each phase of the three-phase voltage signals using the plurality of circulating currents from the plurality of inductive components; and a plurality of combiner circuits, wherein each combiner circuit is associated with a phase of the three-phase voltage signals, and wherein the combiner circuits combine the voltage modulation signals and the current sharing modulation signals respectively associated with each phase of the three-phase voltage signals to generate PWM control signals.

12. The control system of claim 11, wherein the current sharing channels are configured to receive circulating currents from a plurality of inter-cell transformers.

13. The control system of claim 12, wherein the current sharing channels are configured to receive circulating currents from a plurality of inductors.

14. The control system of claim 12, wherein the current sharing channels comprise a resonant frequency controller having a center frequency proximate a fundamental frequency of each phase of the three-phase voltage signals.

15. The control system of claim 13, wherein each current sharing channel has a frequency transform response generally corresponding to:

$$C(s) = \underbrace{\left(k_p + \frac{k_i}{s}\right)}_{DC} + \underbrace{\left(K_{lo} + \frac{K_l s}{s^2 + \Delta\omega_l s + \omega_l^2}\right)}_{\text{Low frequency}} + C_{ph} * \underbrace{\left(K_{f0} + \frac{K_f s}{s^2 + \Delta\omega_f s + \omega_f^2}\right)}_{\text{Fundamental frequency}}$$

where $$C_{ph} = \frac{k(s + \omega_1)}{(s + \omega_2)^2}$$

wherein $\omega_l$ defines a center frequency of a low-frequency filter, $\omega_f$ defines a center frequency of a fundamental frequency filter, $\Delta\omega_l$ defines a bandwidth of the low-frequency filter, $\Delta\omega_f$ defines a bandwidth of the fundamental frequency filter, $K_{l0}$ and $K_{f0}$ define magnitudes of pass bands of the low-frequency filter and fundamental frequency filter, respectively, $K_l$ and $K_f$ define peak gains of the low-frequency filter and fundamental frequency filter, respectively, and $C_{ph}(s)$ is a phase delay compensator providing phase compensation around the fundamental frequency.

16. A power conversion system configured to supply multiphase power, the multiphase power having a phase voltage respectively associated with each phase of the multiphase power, the power conversion system comprising:
 a PWM drive circuit;
 a plurality of inverters having inputs coupled to the PWM drive circuit;
 a plurality of inductive components coupled to PWM voltage outputs of the plurality of inverters;
 a plurality of power supply output terminals coupled to the outputs of the plurality of the inductive components;
 a plurality of current sensors coupled to the plurality of inductive components;
 a voltage controller coupled to the plurality of inductive components;
 a current sharing system coupled to the plurality of current sensors;
 a combiner circuit coupled to outputs of the voltage controller and to outputs of the current sharing system; and
 a drive circuit coupled to the combiner circuit.

17. The power conversion system of claim 16, wherein the plurality of inductive components include inter-cell transformers.

18. The power conversion system of claim 16, wherein the plurality of inductive components include inductors.

19. The power conversion system of claim 17, wherein the plurality of current sensors are coupled to the inter-cell transformers to provide signals corresponding to twice a circulating current flowing through each of the inter-cell transformers.

20. The power conversion system of claim 16, wherein the current sharing system comprises a plurality of current sharing controllers arranged in pairs, wherein each pair of the plurality of current sharing controllers is coupled to a respective current sensor.

21. The power conversion system of claim 20, wherein each current sharing controller of each pair of current sharing controllers comprises a resonant controller having a center frequency proximate a fundamental frequency of voltages at the plurality of power supply terminals.

22. The power conversion system of claim 16, further comprising a DC power source coupled to the plurality of inverters, wherein the plurality of inverters are coupled to a common DC bus.

23. A method for controlling a multiphase power conversion system comprising:
 generating voltage modulation signals in response to each phase voltage of the multiphase power;
 detecting circulating currents flowing through a plurality of inter-cell transformers, each of which are associated with a respective phase voltage;
 applying a controller to the detected circulating currents pursuant to generating current sharing modulation signals corresponding to the circulating currents; and
 combining voltage modulation signals and current sharing modulation signals to generate PWM control signals.

24. The method of claim 23, wherein applying the controller comprises applying a resonant controller at a center frequency proximate a fundamental frequency of each phase of the multiphase power.

25. The method of claim 23, wherein applying the controller comprises applying a controller having a transform frequency response generally corresponding to:

$$C(s) = \underbrace{\left(k_p + \frac{k_i}{s}\right)}_{DC} + \underbrace{\left(K_{lo} + \frac{K_l s}{s^2 + \Delta\omega_l s + \omega_l^2}\right)}_{\text{Low frequency}} + C_{ph} * \underbrace{\left(K_{f0} + \frac{K_f s}{s^2 + \Delta\omega_f s + \omega_f^2}\right)}_{\text{Fundamental frequency}}$$

where $$C_{ph} = \frac{k(s + \omega_1)}{(s + \omega_2)^2}$$

wherein $\omega_l$ defines a center frequency of a low-frequency filter, $\omega_f$ defines a center frequency of a fundamental frequency filter, $\Delta\omega_l$ defines a bandwidth of the low-frequency filter, $\Delta\omega_f$ defines a bandwidth of the fundamental frequency filter, $K_{l0}$ and $K_{f0}$ define magnitudes of pass bands of the low-frequency filter and fundamental frequency filter, respectively, $K_l$ and $K_f$ define peak gains of the low-frequency filter and fundamental frequency filter, respectively, and $C_{ph}(s)$ is a phase delay compensator providing phase compensation around the fundamental frequency.

* * * * *